Sept. 23, 1941.　　　　　D. S. HARDER　　　　　2,256,558
FLASH REMOVER
Filed July 22, 1939　　　　6 Sheets-Sheet 1

INVENTOR.
DELMAR S. HARDER
BY
Barnes, Kisselle, Laughlin & Raisch
ATTORNEYS.

Sept. 23, 1941.   D. S. HARDER   2,256,558
FLASH REMOVER
Filed July 22, 1939   6 Sheets-Sheet 2

INVENTOR.
DELMAR S. HARDER
BY
Barnes, Kisselle, Laughlin & Reach
ATTORNEYS.

Sept. 23, 1941.    D. S. HARDER    2,256,558
FLASH REMOVER
Filed July 22, 1939    6 Sheets-Sheet 3

INVENTOR.
DELMAR S. HARDER
BY
Barnes, Kisselle, Laughlin & Raisch
ATTORNEYS.

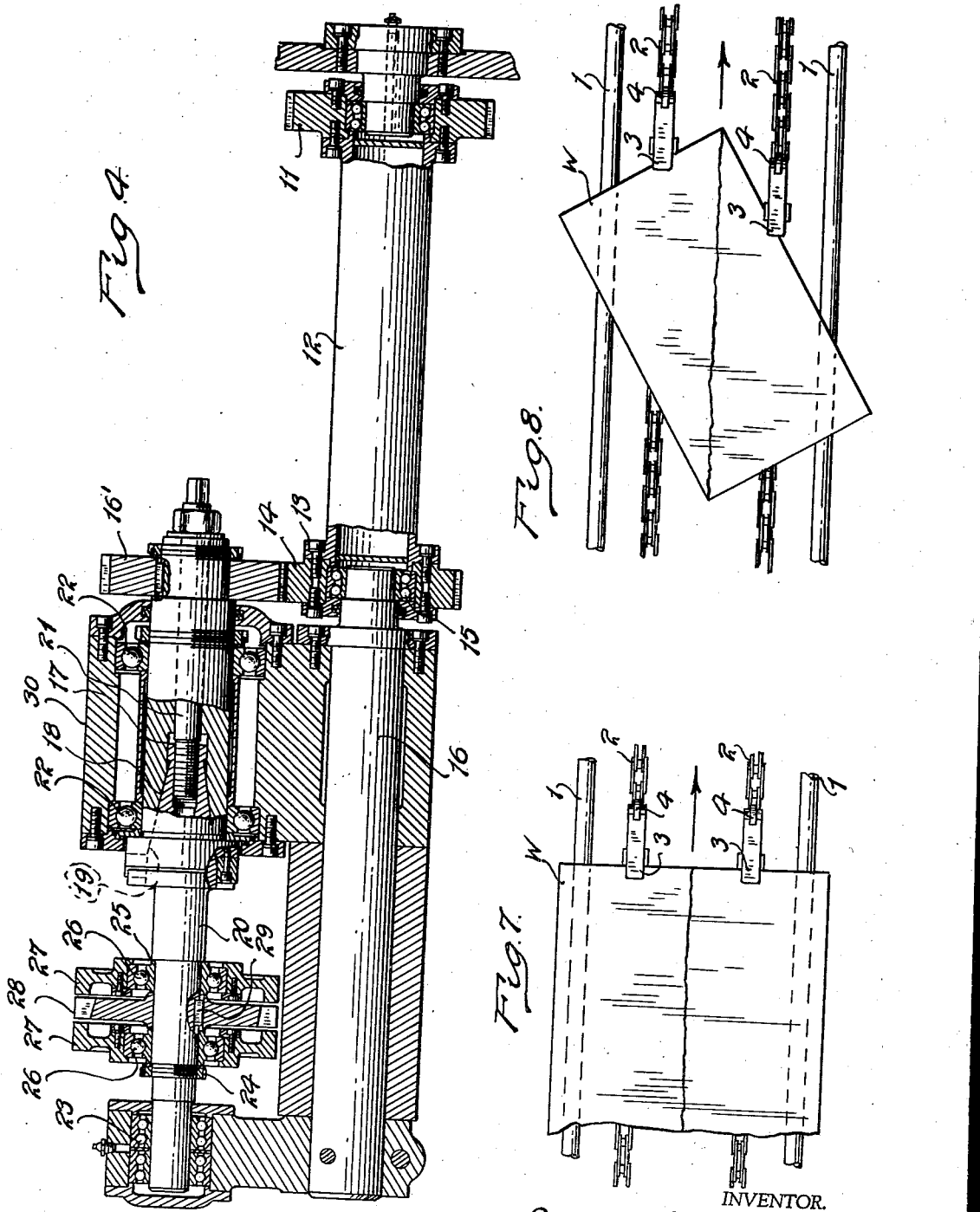

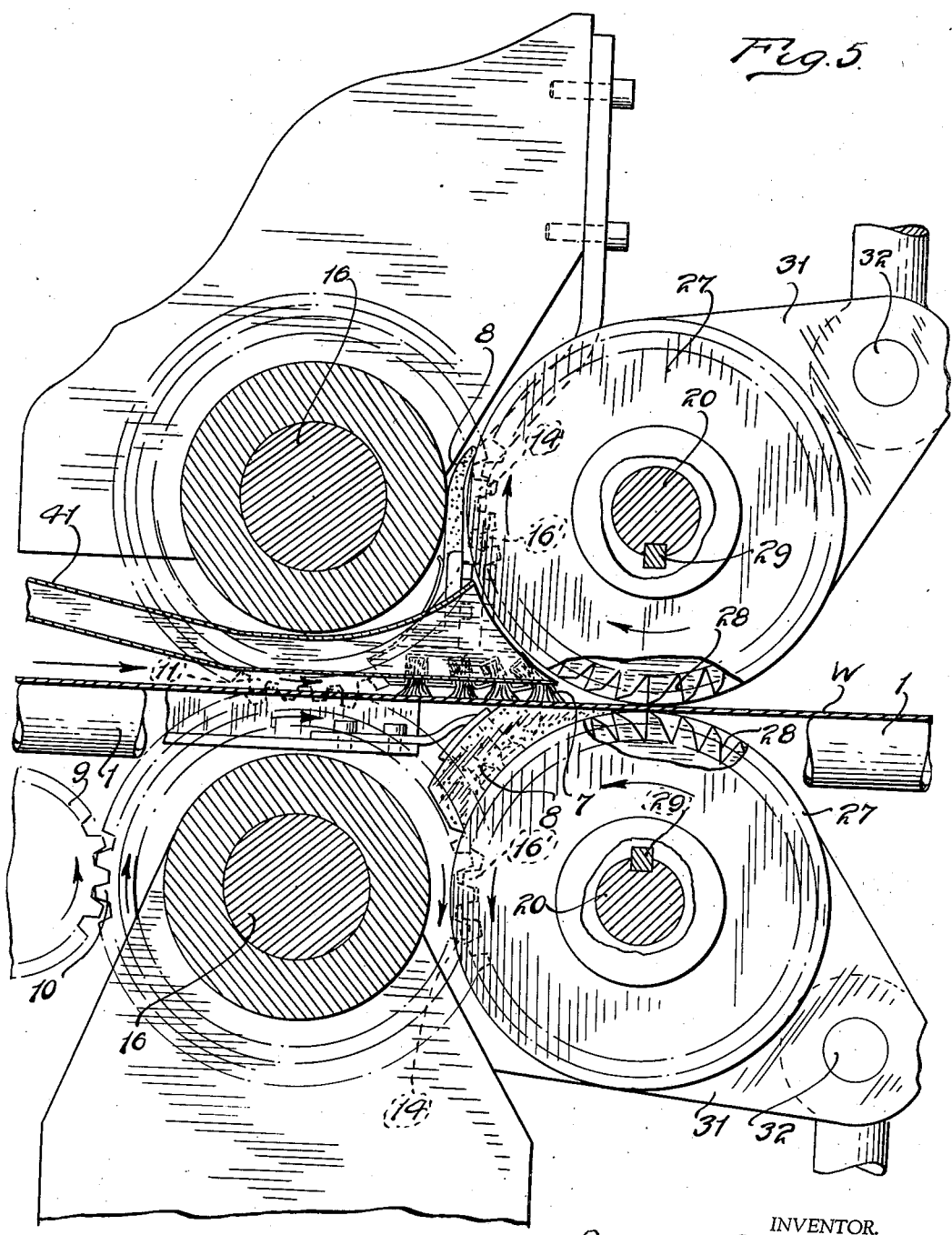

Sept. 23, 1941.         D. S. HARDER         2,256,558
                        FLASH REMOVER
                    Filed July 22, 1939         6 Sheets-Sheet 6
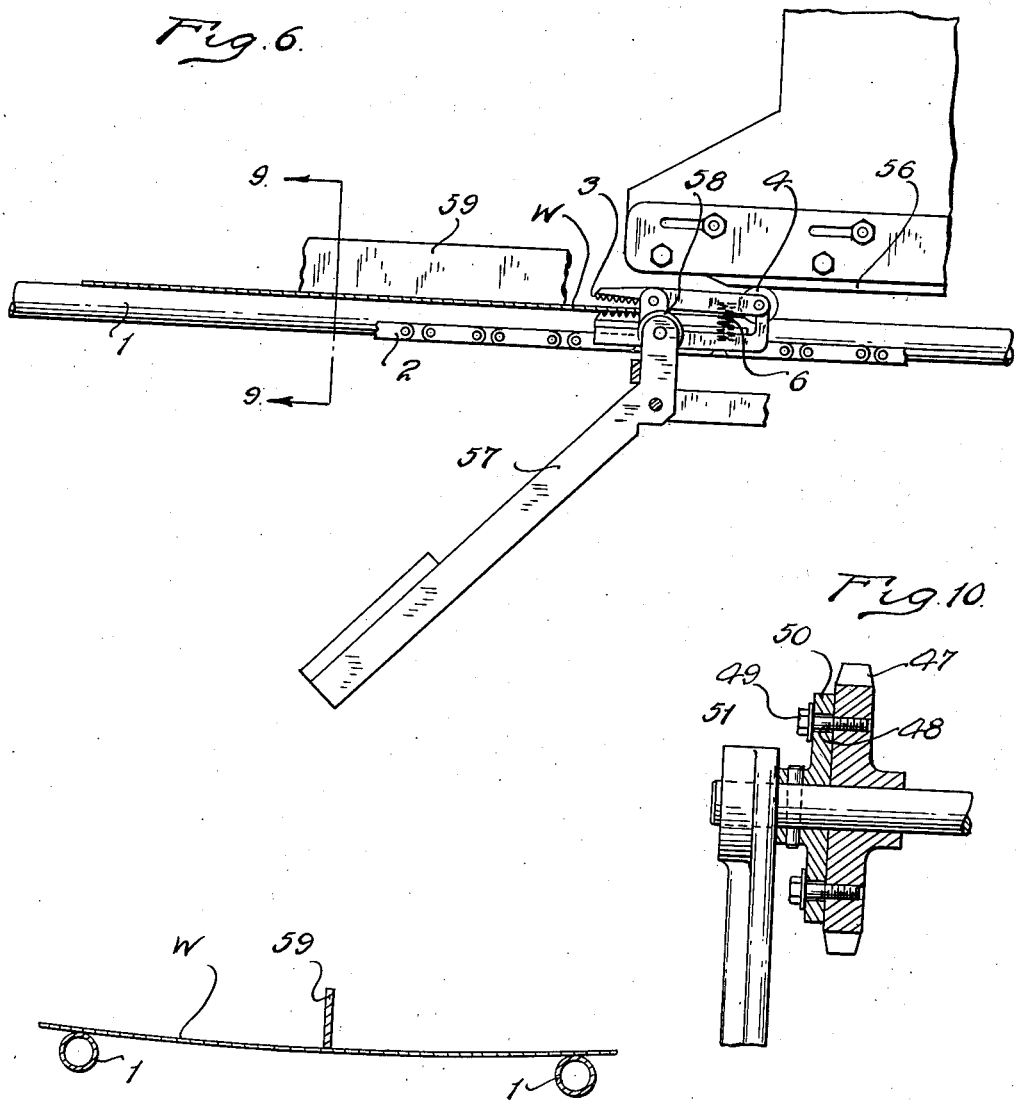
INVENTOR.
DELMAR S. HARDER
BY
Barnes, Kisselle, Laughlin & Raisch
ATTORNEYS.

Patented Sept. 23, 1941

2,256,558

UNITED STATES PATENT OFFICE 2,256,558

FLASH REMOVER

Delmar S. Harder, Detroit, Mich., assignor to General Motors Corporation, Detroit, Mich., a corporation of Delaware Application July 22, 1939, Serial No. 285,845

6 Claims. (Cl. 90—21)

This invention relates to welding flash removers. It is old to provide machines for plowing off the flash or burr on sheet metal plates or tubes which are butt or flash welded together. It is also old to remove this flash or burr by milling or grinding operations.

Where the flash is to be removed from tubes, there is not much of a problem in propelling the work through the machine as tubes are usually forced through the welder or other machine by a suitable arrangement of rolls. Where flat pieces of work and especially irregular pieces of work are to be passed through a machine for removing the burr or flash, more of a problem is presented in the way of handling the work.

This machine can be used for any kind of flash or burr removing but is intended primarily for handling pieces of metal that are welded together in salvage operations to make a piece of metal of sufficient size to be used for certain purposes.

In the drawings:

Figs. 1 and 2 constitute one side view of the apparatus laid out on two sheets of the drawings, Fig. 1 being a side elevation of the front part of the machine and Fig. 2 a side elevation of the rear part of the machine.

Fig. 4 is a section taken on the line 4—4 of Fig. 1.

Fig. 5 is a section taken on the line 5—5 of Fig. 3.

Fig. 6 is a detail of a device for releasing the work from the lower jaw.

Fig. 7 is a view of a rectangular piece of work showing how the vises grip work with a seam perpendicular to the end of the work.

Fig. 8 is a similar view showing how the vises handle a piece of work where the welding seam is not perpendicular to the end of the work.

Fig. 9 is a detail section taken on the line 9—9 of Fig. 6 showing how the shoe bends the work slightly in the middle.

Fig. 10 is a view of the drive sprocket shaft showing the adjustable connection between the flange and the sprocket, the same being a sectional view taken on the line 10—10 of Fig. 2.

Figure 1:
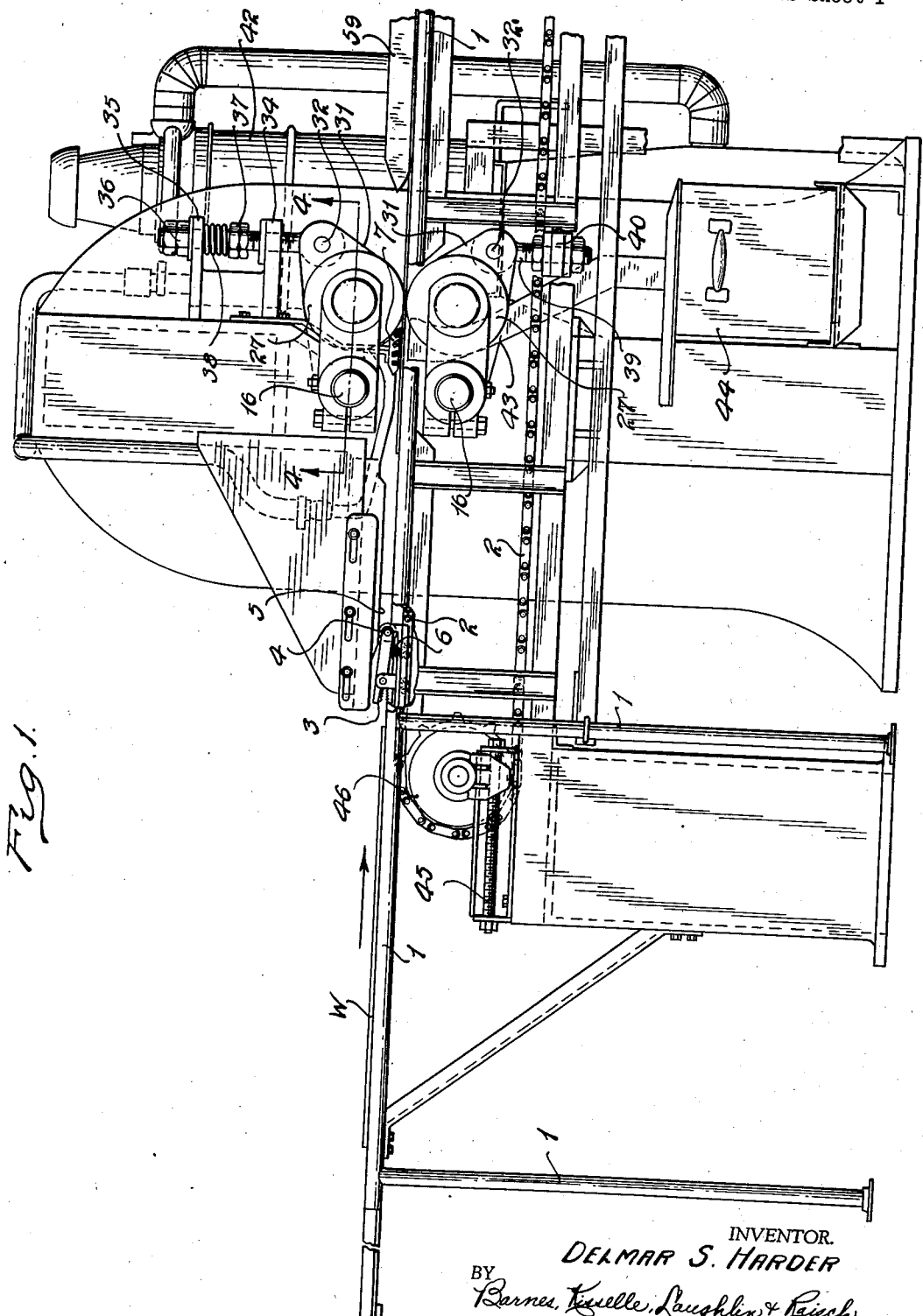
Figure 2:
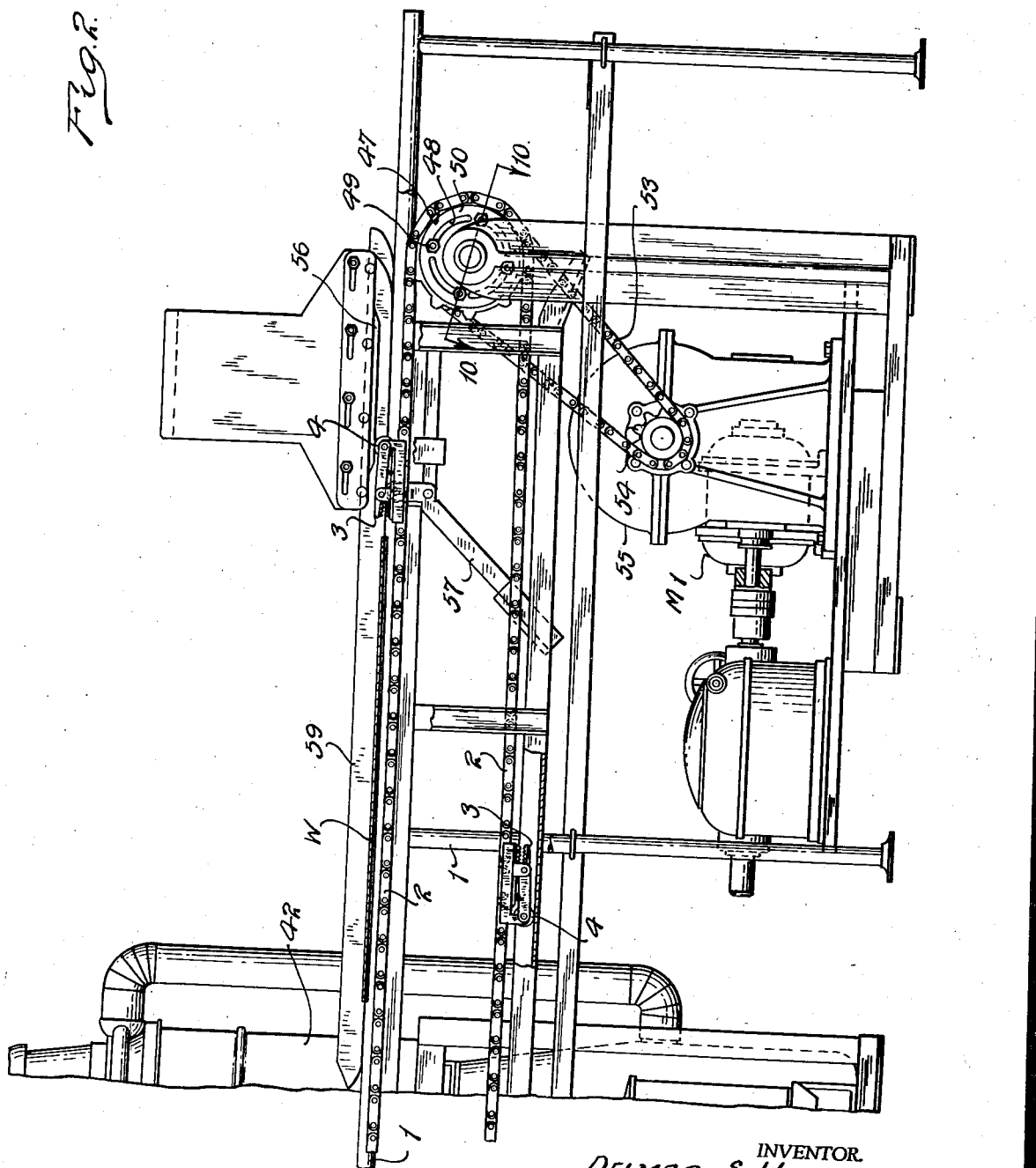
Figure 3:
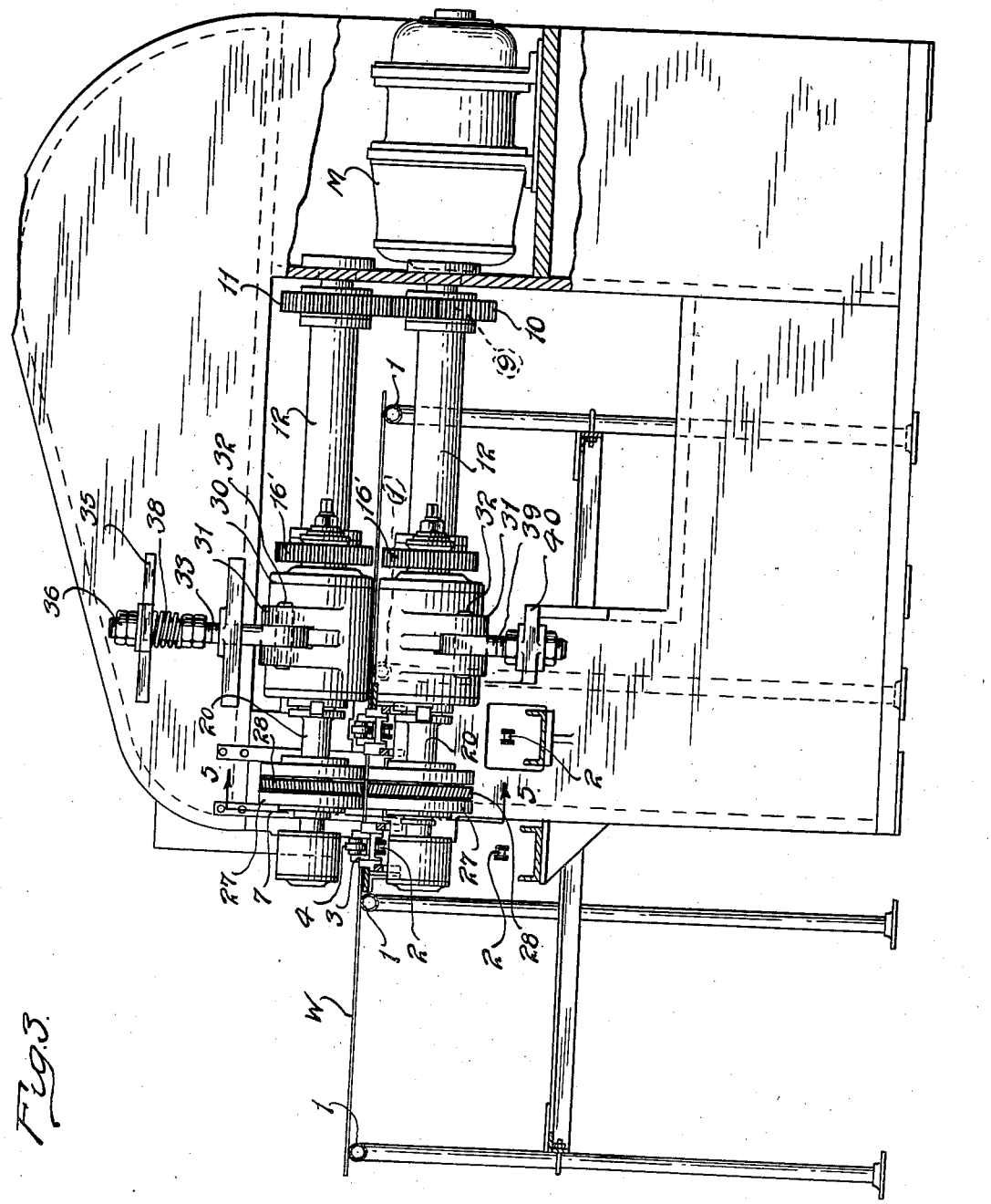
Fig. 3 is an end elevation showing some of the parts in section.

Referring to Fig. 1: W is the work. This is supported on a rack made of tubes. There are four of these longitudinal tubes designated 1 (Fig. 3). There are two continuous conveyor chains 2. Each chain has several vises 3. The vise is provided with teeth at its rear end and the upper vise jaw is provided with a roller 4 at its forward end. This roller (as shown in Fig. 1) strikes the cam 5 which serves to open the jaws. Ordinarily, the jaws are closed by a strong spring 6.

The workman pushes the work W along the longitudinal rack bars in between the jaws until the roller 4 drops off the end of the cam 5. Thereupon, the two jaws, one on each chain, grip the work and pull it to the right. The work adjacent the burr or flash is wiped by the soft brushes 7 which remove any chips or dirt so that the same will not pass in between the gripping rolls. These gripping rolls are also wiped by the felt pads 8 so as to keep them clean. If the work cannot be kept clean, these pressure rolls will press the chips or other foreign particles into the face of the sheets and injure them.

A motor M has a driving pinion 9 which drives gear 10 which meshes with the upper gear 11. These two gears, in turn, drive the shafts which carry the pressure rolls and the milling cutters. Referring to Fig. 4, which is a section looking upwardly through the top set of driving connections, it will be seen that gear 11 is mounted on a shaft 12 which has a flange 13 at its end which is bolted to the gear 14. The gear 14 is journaled on a ball bearing 15 carried on the end of the stationary shaft 16. The gear 14 meshes with gear 16 which is keyed to the end of shaft 17. Shaft 17 is provided with a conical recess 18 in which is fitted the conical end 19 of shaft 20. These two shafts may be pulled together in interlocking relationship by means of the bolt 21. The large shaft 17 is accurately journaled in the ball bearings 22. The smaller shaft 20 has its reduced end journaled in the ball bearings 23. Secured on the shaft 20 by jamb nut 24 and shoulder 25 are the ball bearings 26. The ball bearings freely support the pressure rollers 27 so that these can rotate independently of the shaft and have no propulsive effect on the work which is being driven through by the conveyor chains. The milling cutter 28, however, is connected to the drive shaft 20 by a key 29. A similar arrangement is provided for the lower roller set. The milling cutters and pressure rolls, both the upper and lower, are each adjustable as a unit, angularly about the stationary shafts 16. The large shafts 17 and the ball bearings are housed in the casing 30. This casing 30 has arms 31 which carry the pivot pin 32. An eye-bolt 33 is pivoted to the lugs by the pivot pin 32. This bolt passes up through the two brackets 34 and 35 which are stationary parts of the machine. This eye-bolt has a pair of nuts 36 on the upper end and nuts 37 between the two brackets, one in each set being a jamb nut and the other an adjusting nut. A spring 38 bears against the upper bracket 35 and the lower set of nuts and tends to press the rolls and milling cutter yieldingly against the work. The milling cutter is slightly less in diameter than the rolls, so that the surface of the work outside the flash area is not injured by the cutter. The lower set of rolls is similarly pivoted to swing on the lower stationary shaft 16 and the arrangement is the same here except the eye-bolt 39 is fixedly adjusted in the lower bracket 40 because only one roll and cutter set has to be yieldable.

It will be apparent from the above arrangement that the spacing of the pressure roll and milling cutter sets may be varied with great nicety to accommodate sheets of varying thickness. It will also be apparent that with one roll and cutter set being fixedly adjustable and the other set yieldable toward the first set, continuous and uniform pressure is applied to the work. Irregularities in the surface of the work are compensated for by the yieldable roll and cutter set. A pipe 41 has a flared mouth adjacent the upper milling cutter. This is connected with a vacuum tank 42 known in the trade as the "Hercules tank." This gives a powerful suction near the point where the milling cutters meet for the purpose of drawing the chips away from the metal so that they will not be drawn in between the pressure rolls. A large tube 43 has a flared mouth below the work and adjacent the point where the milling cutters meet for the purpose of conveying the chips into the bin 44.

The chain may be adjusted by means of the screw 45 which can bodily move the left hand sprocket 46. The sprocket at the right end of the conveyor line is designated 47 and this has arcuate slots 48 through which pass bolts 49 which are threaded into the flange 50 on the sprocket driving shaft 51. This shaft is, in turn, driven by sprocket chain 53 which is connected with a pinion 54 which is connected with a gear reduction housing 55 in which the gearing (not shown) is ultimately driven by the motor M¹. The vises are opened by means of a cam 56 at the rear end of the machine. Inasmuch as the lower vise jaw has sharp teeth that embed themselves in the metal, the metal may not free itself from these teeth. Hence, the weighted lever 57 (Fig. 6) is provided which has a roll 58 on its end that projects into the path of the sheet and, when the sheet strikes this roll, it tends to lift the sheet. The roll is, however, not absolutely fixed so as to cause injury or jambing as it is carried on the weighted lever and this lever may swing against the resistance of the weight in case the metal does not at once free itself from the teeth of the lower jaw.

After the cam and the roll on the end of the weighted lever free the work sheet from the vise, the work sheet is carried through the machine supported on the tubes and, when the next vise comes along, the end abuttting the rear end of the sheet carries it through.

I find it desirable to tension the sheet slightly as it leaves the rolls. This is accomplished by the shoe 59 which presses on the sheet down between the two supporting tubes (as shown in Fig. 9). This gives a drag to the sheet so that, when the cam opens the vises, the vises should pull away from the sheet.

I claim:

1. In a machine for removing the burr or flash from welded metal sheets, a milling cutter and roll set comprising a pair of conveyor chains, means for removing the flash and burr, vises on the conveyor chains for gripping the welded sheets to pull the same through the burr removing means, drive connections for the chains and means for advancing one chain with respect to the drive connections and to the other chain for the purpose of giving a different position to the vises to handle work when the weld is not perpendicular to the end of the work sheet.

2. In a machine for removing the burr or flash from welded metal sheets, a milling cutter and roll set comprising a pair of conveyor chains, means for removing the flash and burr, vises on the conveyor chains for gripping the welded sheets to pull the same through the burr removing means, drive connections for the chains and means for advancing one chain with respect to the drive connections and to the other chain for the purpose of giving a different position to the vises to handle work with a weld non-perpendicular to the end of the work, comprising a sprocket wheel with arcuate slots which can be bolted in various angular positions with respect to a flange on the drive shaft.

3. In a machine for removing the burr or flash from welded metal sheets, a milling cutter and roll set, a pair of conveyor chains each provided with one or more vises, a deburring tool for taking off the flash or burr, the vises serving to grip the work to pull it past the deburring tool, each of said vises comprising a pair of pivoted jaws which are normally spring-pressed to closed position and cams located one ahead of the deburring tool and one behind the deburring tool for engaging the jaws to open the same, the forward one to receive the work and the rear one to separate from the work.

4. In a machine for removing the burr or flash from welded metal sheets, a milling cutter and roll set, a pair of conveyor chains each provided with one or more vises, a deburring tool for taking off the flash or burr, the vises serving to grip the work to pull it past the deburring tool, each of said vises comprising a pair of pivoted jaws which are automatically opened and closed, the forward one to receive the work and the rear one to separate from the work and means for pressing on the work to tension it and afford a drag to cause the work to separate from the jaws when the same are opened after the deburring operation.

5. In a machine for removing the burr or flash from welded metal sheets, a milling cutter and roll set, a pair of conveyor chains each provided with one or more vises, a deburring tool for taking off the flash or burr, the vises serving to grip the work to pull it past the deburring tool, each of said vises comprising a pair of pivoted jaws which are automatically opened and closed and cams located one ahead of the deburring tool and one behind the deburring tool for engaging the jaws to open the same, and an obstruction in the path of the sheet extending slightly above the height of the sheet for tending to separate the sheet from the jaws when the jaws are opened.

6. In a machine for removing the burr or flash from welded metal sheets, milling cutters and roll set, a pair of conveyor chains each provided with one or more vises, deburring tools for taking off the flash or burr, the vises serving to grip the work and pull it past the deburring tools, each of said vises comprising a pair of pivoted jaws which are automatically opened and closed and cams located one ahead of the deburring tools and one behind the deburring tools for engaging the jaws to open the same, and an obstruction in the path of the sheet extending slightly above the height of the sheet for tending to separate the sheet from the jaws when the jaws are opened, said obstruction comprising a member carried on a weighted lever which permits the obstruction to swing out of the way to prevent jamming of the machine.

DELMAR S. HARDER.